(12) United States Patent
Williams et al.

(10) Patent No.: US 11,041,420 B2
(45) Date of Patent: Jun. 22, 2021

(54) CARBON CAPTURE SYSTEM, APPARATUS, AND METHOD

(71) Applicants: Donald Williams, The Woodlands, TX (US); Erik Rodriguez, Houston, TX (US)

(72) Inventors: Donald Williams, The Woodlands, TX (US); Erik Rodriguez, Houston, TX (US)

(73) Assignee: M-TRIGEN, INC., Houston, TX (US)

(*) Notice: Subject to any disclaimer, the term of this patent is extended or adjusted under 35 U.S.C. 154(b) by 517 days.

(21) Appl. No.: 15/711,908

(22) Filed: Sep. 21, 2017

(65) Prior Publication Data
US 2018/0094560 A1 Apr. 5, 2018

Related U.S. Application Data

(60) Provisional application No. 62/397,910, filed on Sep. 21, 2016.

(51) Int. Cl.
*F01N 3/08* (2006.01)
*F01N 3/04* (2006.01)
(Continued)

(52) U.S. Cl.
CPC ............ *F01N 3/0857* (2013.01); *A01G 7/02* (2013.01); *A01G 25/00* (2013.01); *B01D 53/047* (2013.01);
(Continued)

(58) Field of Classification Search
CPC .... A01G 25/00; A01G 7/02; B01D 2253/106; B01D 2253/108; B01D 2257/504;
(Continued)

(56) References Cited

U.S. PATENT DOCUMENTS 3,615,290 A 10/1971 Nixon
3,632,306 A 1/1972 Villiers-Fisher et al.
(Continued)

FOREIGN PATENT DOCUMENTS

EP 2108888 A1 10/2009
GB 2059791 A 4/1981
(Continued)

OTHER PUBLICATIONS

WO 2015-114986, Aug. 2015, machine translation.*
(Continued)

*Primary Examiner* — Phutthiwat Wongwian
*Assistant Examiner* — Diem T Tran
(74) *Attorney, Agent, or Firm* — Alberto Q. Amatong, Jr.; Amatong McCoy LLC

(57) ABSTRACT

A combined power conversion and carbon capture and recycling subsystem including a fossil fueled oxidation unit, a physical adsorbent CO2 capture medium, rotor, motor, heater, CO2 compressor, diffuser and water storage tank. Exhaust gas from fossil fuel oxidation is scrubbed of CO2 via passage across a physical adsorbent and then released from the adsorbent via fuel oxidation waste heat. High CO2 concentration scrubber exhaust air is then compressed and fed to a diffuser which facilitates dissociation of the CO2 into water where it is temporarily stored for use in watering plants. Carbon from fossil fuel is recycled back into the environment and permanently stored as biomass by natural means of photosynthesis.

16 Claims, 7 Drawing Sheets

(51) Int. Cl.
- *B01D 53/62* (2006.01)
- *B01D 53/84* (2006.01)
- *F01N 9/00* (2006.01)
- *B01D 53/06* (2006.01)
- *A01G 7/02* (2006.01)
- *A01G 25/00* (2006.01)
- *B01D 53/04* (2006.01)
- *B01D 53/047* (2006.01)

(52) U.S. Cl.
CPC ......... *B01D 53/0462* (2013.01); *B01D 53/06* (2013.01); *B01D 53/62* (2013.01); *B01D 53/84* (2013.01); *F01N 3/04* (2013.01); *F01N 9/00* (2013.01); *B01D 2253/106* (2013.01); *B01D 2253/108* (2013.01); *B01D 2257/504* (2013.01); *B01D 2258/01* (2013.01); *B01D 2259/40001* (2013.01); *F01N 2240/02* (2013.01); *F01N 2240/26* (2013.01); *F01N 2570/10* (2013.01); *Y02C 20/40* (2020.08); *Y02P 60/20* (2015.11); *Y02T 10/12* (2013.01); *Y02T 10/40* (2013.01)

(58) Field of Classification Search
CPC ...... B01D 2258/01; B01D 2259/40001; B01D 53/0462; B01D 53/047; B01D 53/06; B01D 53/62; B01D 53/84; F01N 2240/02; F01N 2240/26; F01N 2570/10; F01N 3/04; F01N 3/0857; F01N 9/00; Y02C 10/04; Y02C 10/08; Y02P 60/24; Y02T 10/20; Y02T 10/47
See application file for complete search history.

(56) References Cited

U.S. PATENT DOCUMENTS

| | | | |
|---|---|---|---|
| 3,888,652 | A | 6/1975 | Yie et al. |
| 4,133,671 | A | 1/1979 | Mikel |
| 4,247,321 | A | 1/1981 | Persinger |
| 4,333,992 | A | 6/1982 | Healy |
| 4,595,465 | A | 6/1986 | Ang et al. |
| 4,800,848 | A | 1/1989 | Hubbard |
| 4,899,544 | A | 2/1990 | Boyd |
| 5,202,103 | A | 4/1993 | Chang et al. |
| 5,406,933 | A | 4/1995 | Lu |
| 5,682,709 | A * | 11/1997 | Erickson .................. A01G 7/02 47/1.4 |
| 5,779,464 | A | 7/1998 | Fan et al. |
| 5,937,799 | A | 8/1999 | Binion |
| 6,108,967 | A | 8/2000 | Erickson |
| 6,237,284 | B1 | 5/2001 | Erickson |
| 6,280,485 | B1 | 8/2001 | Daly et al. |
| 6,521,026 | B1 | 2/2003 | Goto |
| 6,589,901 | B2 | 7/2003 | Yamamoto et al. |
| 6,662,758 | B1 | 12/2003 | Shin |
| 7,022,168 | B2 | 4/2006 | Schimkat et al. |
| 7,846,240 | B2 | 12/2010 | Gal et al. |
| 8,114,367 | B2 | 2/2012 | Riman et al. |
| 8,137,444 | B2 | 3/2012 | Farsad et al. |
| 8,500,886 | B2 | 8/2013 | Okano et al. |
| 8,529,664 | B2 | 9/2013 | Deckman et al. |
| 8,894,743 | B2 | 11/2014 | Sceats |
| 9,102,530 | B2 | 8/2015 | Sundaram et al. |
| 9,266,057 | B1 * | 2/2016 | Jones .................. B01D 53/1425 |
| 9,283,515 | B2 | 3/2016 | Ogino |
| 9,314,731 | B2 | 4/2016 | Chen et al. |
| 9,370,744 | B2 | 6/2016 | Petruska et al. |
| 9,504,955 | B2 | 11/2016 | Elliott et al. |
| 9,630,143 | B2 | 4/2017 | Eisenberger et al. |
| 2005/0252215 | A1 | 11/2005 | Beaumont |
| 2006/0010947 | A1 | 1/2006 | Lewis |
| 2008/0121105 | A1 | 5/2008 | Schubert et al. |
| 2010/0196234 | A1 | 8/2010 | Hammer et al. |
| 2011/0061371 | A1 | 3/2011 | Cavataio et al. |
| 2011/0064634 | A1 * | 3/2011 | Enos .................. B01D 53/62 423/220 |
| 2012/0133939 | A1 | 5/2012 | Yaghi et al. |
| 2013/0298532 | A1 | 11/2013 | Hamad et al. |
| 2015/0273385 | A1 | 10/2015 | Eisenberger |
| 2016/0016108 | A1 | 1/2016 | Park et al. |

FOREIGN PATENT DOCUMENTS

| | | | |
|---|---|---|---|
| JP | 2005218571 | * | 8/2005 |
| KR | 101454416 | B1 | 11/2014 |
| TW | 201511816 | A | 4/2015 |
| WO | 2010043323 | A2 | 4/2010 |
| WO | WO 2015-114986 | * | 8/2015 |
| WO | 2015177361 | A1 | 11/2015 |
| WO | 2016005226 | A1 | 1/2016 |

OTHER PUBLICATIONS

International Preliminary Report on Patentability issued in PCT Application No. PCT/US2017/052778, dated Apr. 4, 2019; 12 pages.

Notification of Transmittal of International Search Report and Written Opinion dated Jan. 30, 2018 (issued in PCT Application No. PCT/US2017/052778 [14 pages].

David, Jeremy; Herzog, Howard; "The Cost of Carbon Capture"; 6 pages, Massachusetts Institute of Technology (MIT), Cambridge, Massachusetts, USA.

Donohue, Randall J.; Roderick, Michael L.; McVicar, Tim R.; Farquhar, Graham D.; "Impact of CO2 fertilization on maximum foliage cover across the globe's warm, arid environments"; Journal of the American Geophysical Union, Geophysical Research Letters, Jun. 19, 2013, pp. 3031-3035, vol. 40.

Esber III, George Salem; "Carbon Dioxide Capture Technology for the Coal-Powered Electricity Industry: A Systematic Prioritization of Research Needs", Jun. 2006, pp. 1-103, Massachusetts Institute of Technology.

Leung, Dennis Y.C.; Caramanna, Giorgio; Maroto-Valer, M. Mercedes; "An overview of current status of carbon dioxide capture and storage technologies", Renewable and Sustainable Energy Reviews, 2014, pp. 426-443, Elsevier Ltd.

Songolzadeh, Mohammad; Soleimani, Mansooreh; Ravanchi, Maryam Takht; Songolzadeh, Reza; "Carbon Dioxide Separation from Flue Gases: A Technological Review Emphasizing Reduction in Greenhouse Gas Emissions"; The Scientific World Journal, Feb. 17, 2014, pp. 1-34, vol. 2014, Article ID 828131, Hindawi Publishing Corporation.

Storlie, Craig A.; Heckman, Joseph R.; "Soil, Plant, and Canopy Responses to Carbonated Irrigation Water"; Hort Technology, Apr.-Jun. 1996, pp. 111-114, vol. 6, No. 2, New Jersey Agricultural Experiment Station publication No. D-03150-16-95, supported by state and U.S. Hatch Act funds, New Jersey.

Yu, Cheng-Hsiu; Huang, Chih-Hung; Tan, Chung-Sung; "A Review of CO2 Capture by Absorption and Adsorption", Aerosol and Air Quality Research, 2012, pp. 745-769, vol. 12, Taiwan Association for Aerosol Research, Taiwan.

* cited by examiner

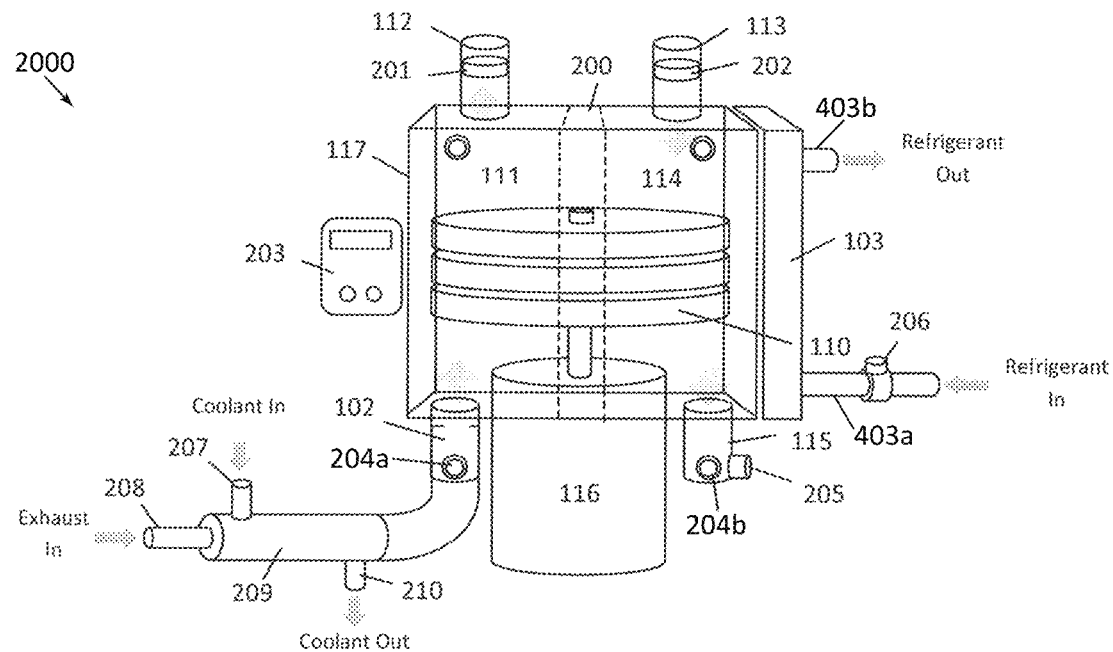
FIG. 3
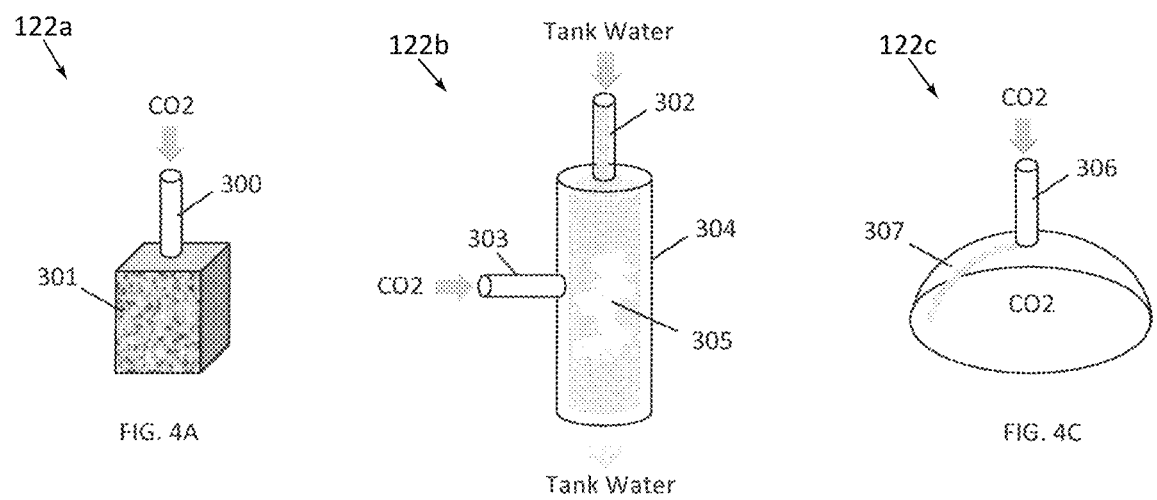
FIG. 4A
FIG. 4B
FIG. 4C

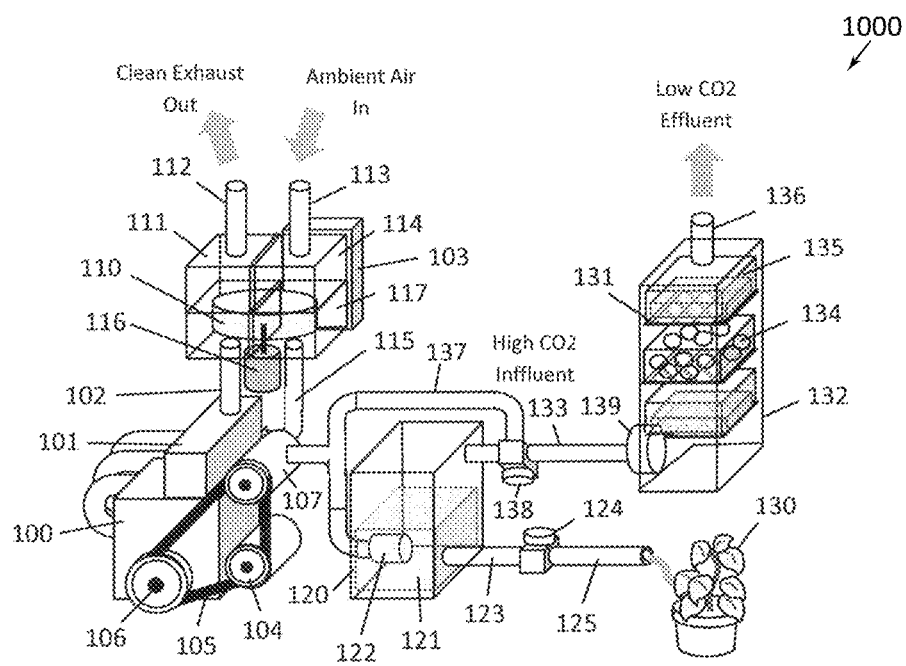
FIG. 7A
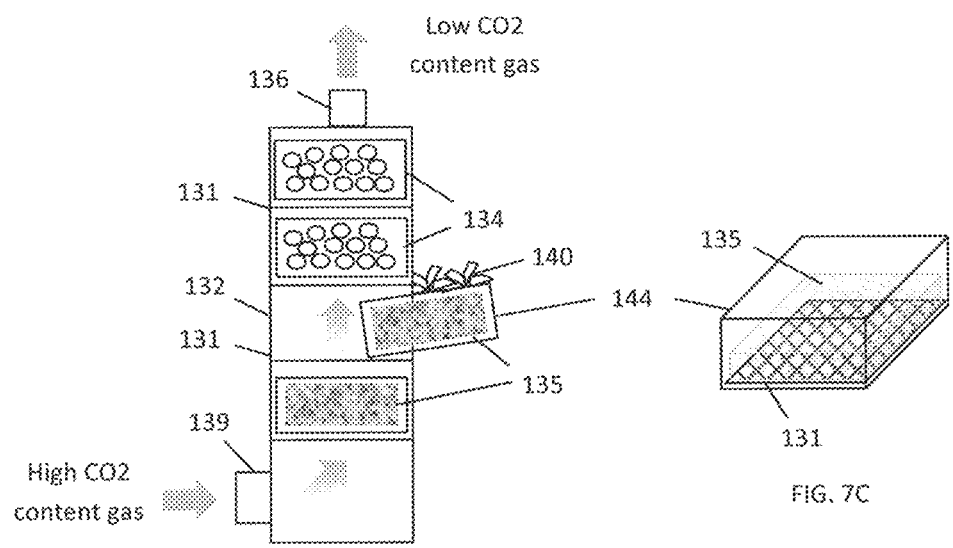
FIG. 7B
FIG. 7C

CARBON CAPTURE SYSTEM, APPARATUS, AND METHOD

CROSS-REFERENCE TO RELATED APPLICATIONS

The present application claims the benefit of U.S. Provisional Patent Application No. 62/397,910, filed on Sep. 21, 2016, the entirety of which is incorporated herein by reference for all purposes and made a part of the present disclosure.

FIELD

The present disclosure relates generally to a system, apparatus, and method of capturing and\or sequestration, or otherwise managing, handling or manipulating carbon. More specifically, the present disclosure relates to a system, apparatus, and method of capturing or sequestering carbon from fossil fuel residue or fossil fuel plant exhaust gases. In some aspects, the present disclosure relates to a power generating system or apparatus or method of power generating that includes a carbon management component, system, or apparatus. In some aspects, the present disclosure relates to a system, apparatus, and method of providing carbonated water to plant life.

BACKGROUND

Concern over environmental effects of green house gasses has resulted in significant effort to reduce overall atmospheric $CO_2$ including reforesting, increased use of renewable energy sources, and the carbon capture and storage (CCS, also referred to as carbon capture and sequestration) of carbon from fossil fuel plant exhaust gasses. CCS is now mandated internationally by many advisory and regulatory agencies with both EU and US Department of Energy directives requiring greater 90% recovery rates. This has led to a vast array of CCS technologies, such as those disclosed in U.S. Pat. Nos. 8,114,367,B2; 5,779,464; and 4,595,465, most of which, in one form or another, typically employ post-production scrubbing of combustion flue gasses of $CO_2$ using a solvating agent which reacts with and sequesters carbon.

Although many such technologies, such as that disclosed in U.S. Patent Publication No. 2008/0121105, utilize metal-organics, which are highly effective, CCS technology remains a challenge due to its inherent expense and resulting reduction in fuel efficiency. Capital, operating, and energy costs may result in efficiency penalties ranging from 10% for natural gas (NG) production to 25% for petroleum based power plants. These expenses are divided into two main components, including: (1) the energy cost of the scrubbing process itself, and (2) the cost of carbon transport and storage. The latter is typically handled via geo-sequestration by: (1) pumping $CO_2$ directly into geological formations, such as oil and gas fields, abandoned coal mines and saline formations; (2) storing $CO_2$ in a solid state as carbonates; or (3) dumping $CO_2$ into the ocean. No matter the method, the results are costly. The first method requires the construction of piping networks and pumping stations, as well as the dumping of caprock to ensure containment. The second method requires additional energy to heat the sequestering mineral source to achieve practical conversion rates, with added transport costs if it is not stored at the site of conversion. The last method is largely unworkable due to the potential of oceanic acidification, such that the practice has been deemed illegal by most governing agencies.

While the mechanics of carbon capture is a chemical process with inherent limitations and costs independent of the location or application, sequestration is a highly variable expense, being roughly proportional to production size and accessibility, making it a particularly high expense for large isolated plants used in distributed power production.

SUMMARY

Various aspects described herein or otherwise contemplated by the present disclosure seek to expand the use of CCS technology by providing a simple and cost effective carbon capture process while eliminating both the transport and sequestration phases, making said process available for a wide range of applications.

Further, such exemplary systems or methods also reduce general atmospheric $CO_2$ by enhancing plant photosynthesis at the site of energy production. This is achieved using a fossil fueled powered energy conversion unit, such as a combined heating and power (CHP) or combined cooling, heating and power (CCHP) system, a water heater or gas powered clothes dryer equipped with a physical adsorbent based carbon capture system with an integrated aqueous dissociation unit for storing captured carbon as carbonated water, which may be used to irrigate local vegetation. Thus, such exemplary systems or methods afford disposal of captured carbon directly at the site of production via photosynthesis, eliminating transport and storage costs as well as the risk of potential leakage or environmental damage, while operating at high energy efficiencies characteristic of local power generation by providing a zero to even negative carbon footprint.

In accordance with certain aspects, a system or method may be composed of a natural gas fueled oxidation unit combined with a reversible adsorbing carbon capture unit and a water storage tank with a diffuser to facilitate tank water carbonation. As opposed to common liquid amine scrubbing, the carbon capture unit used here is a solid adsorbent, such as an alkali mineral oxide or zeolite, e.g., magnesium, potassium, and lithium silicates, in which carbon affinity is temperature dependent, as described in U.S. Pat. No. 6,521,026 B1, the entirety of which is incorporated herein and made a part of the present disclosure. Cycling is achieved by convection of combustion exhaust gas across the solid adsorbent, which is fixed to a continuously revolving rotor mounted such that the rotor axis is parallel to a divider separating two thermally isolated chambers maintained at temperatures designed to accept and reject carbon adherence, respectively. Thus, raw engine exhaust gas is first funneled through a lower temperature scrubber chamber in which carbon within the $CO_2$ adheres to the solid adsorbent forming an adsorbent-carbon complex, and is then carried out of the lower temperature scrubber chamber (i.e., the adsorbing chamber) via the revolving rotor into a higher temperature scrubber chamber (i.e., the releasing chamber). With the releasing chamber, the rotor and adsorbent-carbon complex is heated to release the captured carbon from the adsorbent and into a carbon carrier air for discharge to a sequestration unit. Cleansed engine exhaust (i.e., engine exhaust from which carbon has been adsorbed from) is ejected from the exhaust of the adsorbing chamber. Rotor timing is synchronized with engine exhaust load and carbon content, such that the majority of trapped carbon is released upon a single revolution with adsorbent regenerated to accept a new carbon load upon reentering into the adsorbing chamber. Once discharged, the high carbon content exhaust in the releasing chamber is passed through a compressor for compression, and then is injected under pressure through a diffuser, such as a jet, porous ceramic atomizer to facilitate dissociation of the carbon into the water within a holding tank. Finally, the resulting carbonated water may then be used to irrigate local vegetation, providing a natural way to return carbon to the environment via the earth's biochemical carbon cycle.

Further, various design options are noted, which enhance feasibility and optimize performance. Firstly, local energy conversion and waste carbon utilization allow the use of combustion waste heat to directly drive the carbon capture process, while also avoiding the complexities and cost of carbon transfer and storage, greatly increasing the fuel efficiency and lowering overall costs which plague centralized energy production. Secondly, although chemical absorption affords high yields, true chemical bonding combined with low absorption density require high-throughput and high-energy penalties. This, combined with the overall added complexity of the stripping process, solvent degradation, equipment corrosion and higher capital investment, makes physical adsorption a more feasible choice for small-scale commercial applications. It is also noted that, while pressure cycling generally produces higher rates, yields and purities with adsorption methods, temperature cycling is, in some aspects, employed due to its relative simplicity and the ready availability of engine waste heat.

It is also noted that, aside from reducing carbon emissions with higher efficiency and lowered operating costs than possible with central power production and disposing of said carbon in an environmentally friendly manner, the systems, apparatus, and methods disclosed herein also serve to enhance vegetation growth via carbon enriched irrigation, which further helps to reduce atmospheric $CO_2$ through increased rates of photosynthesis, while also increasing biomass yields.

One aspect of the present disclosure includes a micro carbon capture system, including a fossil fuel oxidation unit that oxidizes fossil fuel to convert fossil fuel chemical energy into thermal energy, mechanical energy, electrical energy, or combinations thereof. The system includes a carbon capture unit positioned to receive exhaust gas of the fossil fuel oxidation unit. The carbon capture unit includes a regeneratable physical adsorbent and a cycling mechanism (e.g., rotor driven by a motor) configured to cycle the regeneratable physical adsorbent between a first position (e.g., within an absorbing chamber) and a second position (e.g., within a releasing chamber). In the first position the physical adsorbent is positioned to adsorb $CO_2$ from the exhaust gas and, in the second position the physical adsorbent is positioned to release the $CO_2$.

Another aspect of the present disclosure includes a carbon capture system, including a fossil fuel oxidation unit, a carbon capture unit, and a storage unit in which carbon is stored as a biomass. The fossil fuel oxidation unit is configured to oxidize fossil fuel and convert the fossil fuel chemical energy into an alternate form of energy.

Another aspect of the present disclosure includes to a carbon capture apparatus including a carbon capture component for sequestering carbon from exhaust gases. The apparatus may include a power generating system including an exhaust. The carbon capture unit may be configured to capture exhaust gases from the exhaust.

Another aspect of the present disclosure includes to a method of capturing carbon from a fossil fuel exhaust gases. The method includes sequestering carbon from fossil fuel exhaust gases, including oxidizing fossil fuel and converting the fossil fuel into an alternate form of energy.

Another aspect of the present disclosure includes a method of capturing carbon. The method includes directing exhaust from a fossil fuel oxidation unit into a carbon capture unit, adsorbing $CO_2$ from with the exhaust onto a physical adsorbent within the carbon capture unit, deadsorbing the $CO_2$ from the physical adsorbent within the carbon capture unit, and releasing the deadsorbed $CO_2$ from the carbon capture unit. The method may be implemented using any of the systems and/or apparatus described herein.

BRIEF DESCRIPTION OF DRAWINGS

So that the manner in which the features and advantages of aspects of the present disclosure may be understood in more detail, a more particular description of the briefly summarized aspects above may be had by reference to the aspects which are illustrated in the appended drawings that form a part of this specification. It is to be noted, however, that the drawings illustrate only various exemplary aspects, and are therefore not to be considered limiting of the scope of this disclosure, as it may include other effective aspects as well.

FIG. 3 depicts a physical adsorbent carbon capture unit, according to one aspect of the present disclosure;

FIG. 4A depicts an exemplary micro-pore matrix $CO_2$ diffuser, according to one aspect of the present disclosure;

FIG. 4B depicts an exemplary reactor $CO_2$ diffuser, according to one aspect of the present disclosure;

FIG. 4C depicts an exemplary bell cap $CO_2$ diffuser, according to one aspect of the present disclosure;

FIG. 7A depicts a micro-carbon capture system with soil and alkylation, according to one aspect of the present disclosure;

FIG. 7B depicts a micro-carbon capture system with soil and alkylation, according to one aspect of the present disclosure;

FIG. 7C depicts a portion of the micro-carbon capture system of FIG. 7B, according to one aspect of the present disclosure;

DETAILED DESCRIPTION

Aspects of the present disclosure will now be described more fully with reference to the accompanying drawings, which illustrate various exemplary aspects. The disclosed concepts may, however, be embodied in many different forms and should not be construed as being limited by the illustrated aspects set forth herein. Rather, these aspects are provided so that this disclosure will be thorough as well as complete and will fully convey the scope to those skilled in the art and modes of practicing the aspects.

Figure 1:
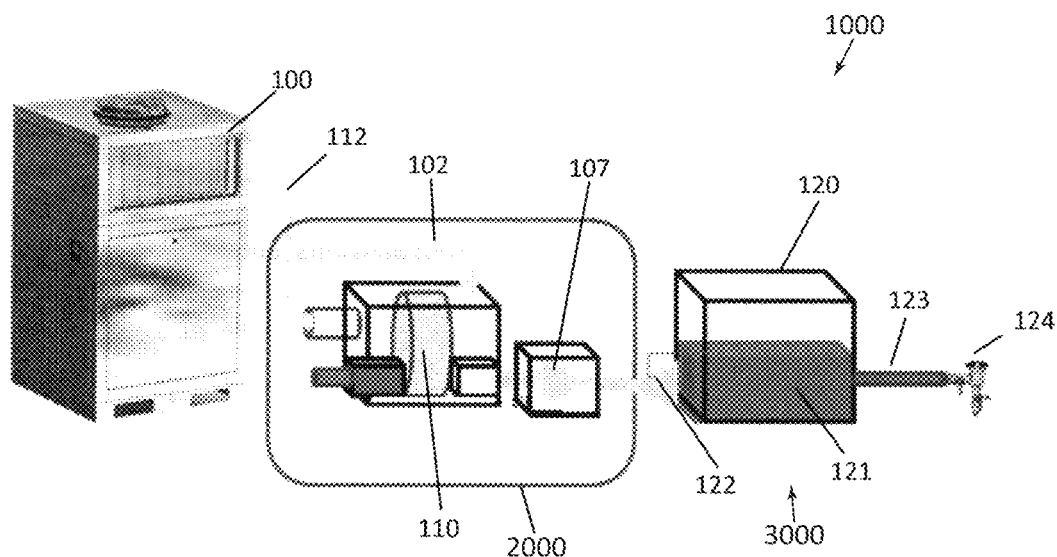
FIG. 1 depicts a micro-carbon capture system, according to one aspect of the present disclosure.
Figure 2:
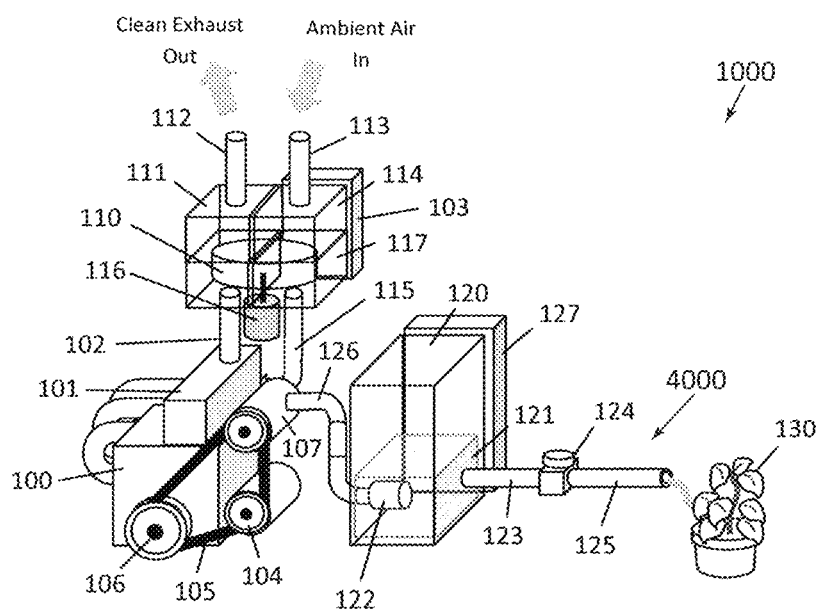
FIG. 2 depicts a micro-carbon capture system and components thereof, according to one aspect of the present disclosure.

In one aspect, as shown in FIGS. 1 and 2, a system 1000 according to the present disclosure includes a micro CHP/CCHP system including internal combustion engine (ICE) 100, a physical adsorbent carbon capture unit 2000 coupled with ICE 100 and configured to receive exhaust therefrom, and carbonated water sequestration unit 3000 coupled with physical adsorbent carbon capture unit 2000 and configured to receive carbon (e.g., CO2) therefrom.

Internal Combustion Engine

The operation of ICE 100 is well known to those skilled in the art, and will only be briefly discussed herein. Crankshaft 106 is operatively coupled to ICE 100, such that ICE 100 drives crankshaft 106. Belt 105 is operatively coupled to crankshaft 106, such that crankshaft 106 drives belt 105. Generator 104 is driven by ICE 100 via belt 105. As is known to those skilled in the art, ICE 100 may be used to provide mechanical and/or electrical power to any of various equipment, for example compressor 107. Exhaust manifold 101 is configured to receive exhaust of ICE 100, and exhaust pipe 102 is configured to receive exhaust from exhaust manifold 101.

With reference to FIGS. 1-4C, physical adsorbent carbon capture unit 2000 includes physical adsorbent carbon scrubber 117 with adsorbent rotor 110 and motor 116, a carbon rich inlet (i.e., exhaust pipe 102), clean air outlet 112, clean air inlet 113, and carbon outlet 115. Carbonated water sequestration unit 3000 includes water tank 120 containing water 121, carbon diffuser 122, water cooler 127, air compressor 107, and water tank inlet 126. Carbonated water sequestration unit 3000 is operatively coupled with irrigation system 4000 and configured to provide irrigation system 4000 with carbonated water from water tank 120. Irrigation system 4000 includes piping 123 and 125, with valve 124 (e.g., irrigation relieve valve) coupled therebetween. In operation, carbonated water from water tank 120 may be provided to vegetation 130.

Physical Adsorbent

Before describing overall system operation, it is perhaps most instructive to first provide an operational summary of certain CCS handling elements of system 1000, including physical adsorbent carbon scrubber 117 and carbon diffuser 122. It should be noted, as there are commercially available physical scrubbers, the description provided herein is general, provided solely for illustration. The physical adsorbent carbon scrubber 117 and carbon diffuser 122 are not limited to the examples provided herein. U.S. Pat. No. 6,521,026 B1, incorporated by reference above, provides relevant background and description of scrubber operation.

In some aspects, physical adsorbent carbon scrubber 117 includes a housing divided into two sections, including low-temperature adsorbing chamber 111 and high-temperature releasing chamber 114 separated by barrier 200. Barrier 200 may be an air-tight barrier. Barrier may be constructed of a thermal insulating material, such as ceramic or glass wool, serving to minimize thermal loss between chambers 111 and 114. Barrier 200 may be centrally placed, bisecting physical adsorbent carbon scrubber 117 and spanning both chambers 111 and 114.

In some aspects, rotor 110 contains wheels or discs carrying a physical adsorbent. The physical adsorbent may be, for example and without limitation, a porous adsorbent matrix (e.g., molecular sieve), such as a metal oxide or zeolite compound. Rotor 110 is driven by motor 116. As described in U.S. Pat. No. 6,521,026 B1, the physical adsorbent may be permanently embedded within rotor wheels, as depicted in FIG. 3, or may be held within baskets housed by the rotor wheels for easy replacement. For example and without limitation, rotor 110 with physical adsorbent may be a carbon white or zeolite based desiccant wheel separator. In some aspects, the physical adsorbent includes an organic-inorganic hybrid or metal-organic framework. In some aspects, the physical adsorbent includes, calcium oxide, silicate, activated carbon, amine-modified activated carbon, mesoporous silicas, or hydrotalcite.

As engine exhaust gas enters physical adsorbent carbon scrubber 117 via exhaust pipe 102, the exhaust is drawn into low-temperature adsorbing chamber 111 and across rotor 110 and the physical adsorbent. In some aspects, exhaust fan 201, which may be positioned within clean air outlet 112, draws the exhaust into low-temperature adsorbing chamber 111. When passing through absorbing chamber 111, $CO_2$ within the exhaust adsorbs onto the physical adsorbent via van der Waals forces, forming an adsorbent-$CO_2$ complex and forming scrubbed clean air having an eliminated or reduced $CO_2$ content relative to the $CO_2$ content of the exhaust entering low-temperature adsorbing chamber 111. The scrubbed clean air may exit low-temperature adsorbing chamber 111 via clean air outlet 112. The low-temperature adsorbing chamber 111 may be maintained within a temperature range suitable for adsorption of $CO_2$ onto the physical adsorbent. The temperature of low-temperature adsorbing chamber 111 may be equal to, greater than, or less than ambient temperature. The temperature of low-temperature adsorbing chamber 111 may be equal to, greater than, or less than the temperature of the exhaust from ICE 100.

As rotor 110 rotates, it carries the adsorbent-$CO_2$ complex into the adjacent high-temperature releasing chamber 114. The adjacent high-temperature releasing chamber 114 may be maintained within a temperature range suitable for release of $CO_2$ from the physical adsorbent. The temperature of adjacent high-temperature releasing chamber 114 is greater than the temperature within low-temperature adsorbing chamber 111. Within high-temperature releasing chamber 114, heater 103 is used to raise and/or maintain the temperature of releasing chamber 114 within a range that is sufficient to free the $CO_2$ from adsorption onto physical adsorbent. Heater 103 may be thermally coupled with a refrigerant flow, such as via refrigerant inlet 403a and refrigerant outlet 403b.

In some aspects, low-temperature adsorbing chamber 111 is maintained at a temperature of equal to or less than 200° C., equal to or less than 120° C., equal to or less than 60° C., or equal to or less than 30° C. In some aspects, low-temperature adsorbing chamber 111 is maintained at a temperature of equal to or greater than 5° C., equal to or greater than 25° C., equal to or greater than 30° C., or equal to or greater than 60° C. In some aspects, low-temperature adsorbing chamber 111 is maintained at a temperature ranging from 5° C. to 200° C., or from 5° C. to 120° C., or from 5° C. to 60° C., or from 5° C. to 30° C., or from 25° C. to 60° C. High-temperature releasing chamber 114 is maintained at a temperature that is greater than that of low-temperature adsorbing chamber 111. In some aspects, high-temperature releasing chamber 114 is maintained at a temperature that is equal to or greater than 5° C., equal to or greater than 10° C., equal to or greater than 15° C., equal to or greater than 20° C., equal to or greater than 25° C., or equal to or greater than 30° C. higher than the temperature within low-temperature adsorbing chamber 111. In some aspects, high-temperature releasing chamber 114 is maintained at a temperature that is equal from 15° C. to 20° C. higher than the temperature within low-temperature adsorbing chamber 111.

In some aspects, the pressure of both low-temperature adsorbing chamber 111 and high-temperature releasing chamber 114 is maintained at ambient and/or standard atmospheric pressure.

While the adsorption and deadsorption is described as varying with temperature, one skilled in the art would understand that adsorption and deadsorption may vary with other parameters, such as pressure or electrical conductivity. For example, regeneration of the physical adsorbent may be achieved via: temperature cycling using a temperature sensitive physical adsorbent; pressure cycling using a pressure sensitive physical adsorbent; or current cycling using an electrical charge sensitive physical adsorbent. In some such aspects, a heat source is provided by a heat exchanger utilizing engine waste heat, either directly via conduction through unit hardware or indirectly via a transfer medium such as refrigerant, to provide the temperature cycling, or the heat source is provided by an electrical heater powered by either a CHP/CCHP generator or an external power source. In other aspects, a pressure source is provided by a compressor powered either mechanically, by a CHP/CCHP crankshaft or electrically by a CHP/CCHP generator or by an external power supply, to provide the pressure cycling. In other aspects, a current source is provided, by either a generator of a CHP/CCHP system or an external power supply, to provide the current cycling.

Compressor

The $CO_2$ released from the physical adsorbent mixes with incoming air from clean air inlet 113 to produce a high $CO_2$ concentration air. The high $CO_2$ concentration air is then drawn out of releasing chamber 114 via outlet 115, such as via inlet fan 202. The high $CO_2$ concentration air is drawn into compressor 107 by the pressure differential created by both inlet fan 202 and the suction of compressor 107. Release of the $CO_2$ from the physical adsorbent regenerates adsorbent, such that the physical adsorbent may again to adsorb additional $CO_2$. Rotor 110 rotates such that the regenerated physical adsorbent is again positioned within adsorbing chamber 111, where the regenerated physical adsorbent adsorbs $CO_2$ from exhaust gas flowing through adsorbing chamber 111, and the $CO_2$ adsorbing-releasing process repeats. It is noted that, although not essential for scrubber operation in general, the exhaust from ICE 100 may first be passed through a pre-cooler, such as double tube heat exchanger 209 via inlet 208 to increase $CO_2$ density and/or reduce temperatures for use with low-temperature physical adsorbents, prior to entering adsorbing chamber 111. The pre-cooler may use any type of refrigerant, which may be circulated through coolant inlet 207 and coolant outlet 210. For example, the refrigerant of pre-cooler may be vapor compression/heat pump refrigerant, water for use with a CCHP or water heater applications. The temperature of the exhaust of ICE 100 may be, for example 80° C. In such an aspects, double tube heat exchanger 209 allows the exhaust to be cooled to, for example, 5-25° C., such as for use with a zeolite physical adsorbent. One skilled in the art would understand that other adsorbents operate at higher or lower temperatures. Thus, in some aspects, cooling of exhaust is not necessary or cooling of the exhaust to a different temperature than 5-25° C. is performed.

It is also noted that, in some aspects, motor 116, compressor 107 and heater 103 are powered directly from the CHP/CCHP system, with motor 116 being driven by generator 104, compressor 107 being driven by engine crankshaft 106 and belt 105, and heater 103 receiving thermal energy provided by ICE 100 waste heat. Heater 103 may receive waste heat directly or by conduction with exhaust manifold 101 and/or associated piping matrix or via a thermal medium, such as a coolant or refrigerant system for convenience and to ensure optimal system efficiency. However, system 1000 is not limited to this particular arrangement, and, in practice, any source of power may be used for each component of system 1000 including external electrical power, such as the grid or local renewable energy sources such as solar or wind power.

Automated Control System

In some aspects, to ensure optimal carbon capture rates, system 1000 is equipped with an automated control system including but not limited to master controller 203, such as a microcontroller, programmed logic controller (PLC) or remote control system. Master controller 203 may be in electrical, operative, and/or data communication (e.g., for sending control signals to and/or receiving data signals from) with: (1) air flow detectors 204a and 204b positioned at the engine exhaust input into adsorbing chamber 111 and carbon outlet 115, respectively; (2) $CO_2$ sensor 205 positioned at carbon outlet 115; (3) temperature sensors for both the adsorption chamber 111 and releasing chamber 114; (4) inlet and exhaust fans 201 and 202; (5) rotor motor 116; (6) throttle valve 206; or combinations thereof. For example, master controller 203 may receive air flow data from detectors 204a and 204b; receive $CO_2$ content data from $CO_2$ sensor 205; receive temperature measurement data from temperature sensors; control the speed of both inlet and exhaust fans 201 and 202 and of rotor motor 116; control the throttle valve 206 for metering refrigerant flow through heater 103; or combinations thereof. With proper control algorithms for master controller 203, master controller 203 may continuously monitor and control unit temperatures to automatically accommodate real-time changes in engine performance and carbon load rates to optimize carbon recovery via: (1) metering of refrigerant using throttle valve 206; (2) controlling convection flow rates through control of fans 201 and 202; (3) controlling the adsorption/regeneration cycle times by controlling rotor motor 116; or combinations thereof. It should noted that system 1000 is not limited to the particular arrangement of sensors and control mechanisms shown in the Figures, and that various other combinations of such sensors and control mechanisms may be used, such as temperature monitoring and control only or rotor speed monitoring and control only depending upon the application and required performance. In some aspects, no monitoring or control is performed.

Carbon Diffuser

The second CCS element is carbon diffuser 122, which serves to disperse and/or atomize the $CO_2$ exiting compressor 107 within the water 121 in a manner that maximizes $CO_2$ carbon dissociation with water 121. Carbonated air exits compressor 107 under high pressure via compressor outlet 126, and enters carbon diffuser 122. In some aspects, water 121 within tank 120 is at a pressure of greater than ambient pressure. For example, the pressure of water 121 within tank 120 may be from 50 to 200 psi, form 75 to 150 psi, or 100 psi. The particular type of diffuser may vary depending upon required performance and budget from a single jet to more complex designs, as long as carbon diffuser 122 is effective in achieving dispersion and/or atomization. FIGS. 4A-4C depict three exemplary diffuser designs, receptively. FIG. 4A depicts carbon diffuser 122a, a microporous diffuser. FIG. 4B depicts carbon diffuser 122b, a reactor diffuser. FIG. 4C depicts carbon diffuser 122c, a bell cover diffuser. Carbon diffuser 122a is a simple, ceramic or glass media with a matrix of fine micropores 301 connected to a positive pressure $CO_2$ supply 300 of sufficient strength to overcome the micropore channel resistance and tank water pressure to force the $CO_2$ into small bubbles totaling a large surface area, affording enhanced dissociation. Carbon diffuser 122a may operate to break pressurized $CO_2$ into micro sized bubbles. Carbon diffuser 122b is, in some aspects, nearly 100% effective at diffusion and/or atomization, but is more expensive and requires power to function. In carbon diffuser 122b, water 121 is re-circulated under positive pressure via a pump or filter to inlet 302, while pressurized $CO_2$ is fed to inlet 303, forcing both water 121 and the pressurized $CO_2$ into mixing chamber 304. Within mixing chamber 304, rising $CO_2$ contacts downward moving tank water 121. With proper pressure and flow rate adjustment, a turbulent interchange is created in which the $CO_2$ is agitated, helping to further break the $CO_2$ into ever smaller bubbles 305. In some aspects, carbon cannot escape mixing chamber 304, such that all or virtually all of the $CO_2$ that enters mixing chamber 304 is eventually dissolved within water 121. Carbon diffuser 122b may function to trap and agitate pressurized $CO_2$ within tank water 121. In carbon diffuser 122c, $CO_2$ enters via inlet 306 into cap 307 and is trapped via cap 307. As with the reactor of carbon diffuser 122b, virtually all the $CO_2$ that enters cap 307 eventually dissociates. However, the disassociation is relatively slow, as carbon diffuser 122c lacks a mechanism to atomize the $CO_2$. Carbon diffuser 122c may function to trap $CO_2$ carbon at the water surface. Due to its high performance characteristics, the reactor design of FIG. 4B (carbon diffuser 122b) is preferred in some aspects. In some aspects, diffuser 122 is a jet with one or more nozzles.

In some aspects, the amount $CO_2$ dissolved into water 121 after dispersion ranges from 3 to 15 SCF/bbl, or from 5-10 SCF/bbl at temperatures ranging from 0-60° C.

General Operation

In operation, exhaust gas from internal combustion engine 100 enters adsorbing chamber 111 of scrubber 117 via exhaust pipe 102, which may or may not be assisted by an exhaust fan 201 depending on the application. $CO_2$ then adsorbs to the physical adsorbent attached to rotor 110, as described above. After adsorption, the $CO_2$ is transferred via cycling of rotor 110 using motor 116 into releasing chamber 114. Within releasing chamber 114, high temperatures from heat exchanger 103, which may be powered by combustion waste heat from ICE 100, liberate the adsorbed $CO_2$. The liberated $CO_2$ is picked up by carrier air entering the releasing chamber 114 via a vacuum or pressure differential created by compressor 107 suction and/or inlet fan 202. The carbonated air then exits the scrubber 117 via carbon outlet 115, where it is compressed by compressor 107 (e.g., an internal combustion powered compressor) and fed under high pressure via outlet 126 to carbon diffuser 122. Within tank 120, the carbon (i.e., $CO_2$) is at least temporarily sequestered as carbonated water 121. In some aspects, tank cooler 127, which may be externally powered or may use the vapor compression cooling system of the CCHP, is used to cool water 121, further enhancing carbonation. Tank cooler 127 may be thermally coupled to water tank 120.

After temporary sequestration, the carbonated water 121 may then be used to irrigate local vegetation 130 by flowing carbonated water 121 through piping 123 and 125 to local vegetation 130. The flow of carbonated water 121 may be controlled via valve 124. Without being bound by theory, it is believed that positive effect in plant growth in hyper-carbonated environments results from both the direct injection of $CO_2$ into surrounding air and irrigation with carbonated water. Irrigation is believed to have a higher impact on soil respiration and root structure remodeling. Irrigation with CO2 temporarily lowers soil pH to levels more favorable to soil respiration, which not only enhances carbon intake but also general nutritional intake and nitrification via enhanced soil respiration and root remodeling with increased and more efficient subsurface biomass. Thus, aspects of the systems and methods disclosed herein provide effectively achieve a zero to negative carbon footprint operation by removing $CO_2$ from combustion gases, discarding of the gases in an economically and environmentally friendly way, and further helping to reduce atmospheric $CO_2$ via the stimulation of photosynthesis and natural sequestration via biomass.

Water Heater & Dryer

Figure 5A:
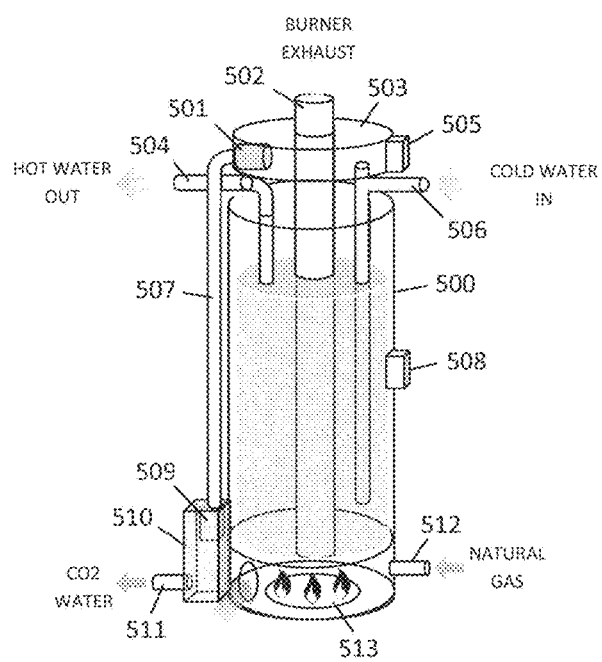
FIG. 5A depicts a gas powered water heater with an integrated micro-carbon capture system, according to one aspect of the present disclosure.
Figure 5B:
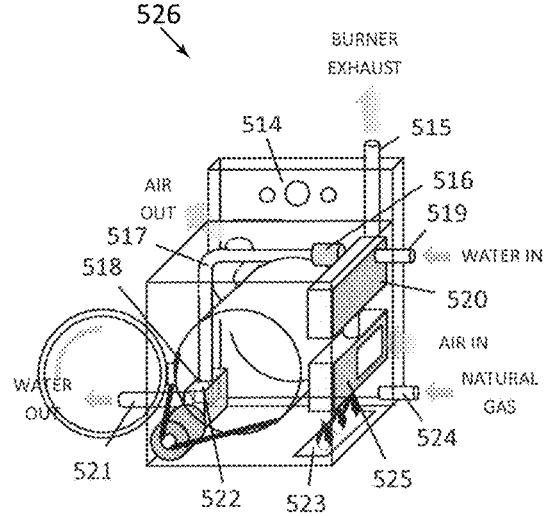
FIG. 5B depicts a gas powered clothes dryer with an integrated micro-carbon capture system, according to one aspect of the present disclosure.

Aside from the use of a CHP/CCHP, as described above, aspects of the system and method disclosed herein may also be applicable to any fossil fuel based power conversion device for which carbon capture may be feasible or required to accommodate environmental protocols. Typical examples of possible devices include common household appliances, such as a gas powered water heater or clothes dryer, as is shown in FIGS. 5A and 5B. Water heater 500 of FIG. 5A contains typical heater components, such as burner 513, gas inlet 512, cold water inlet 506, hot water outlet 504, burner exhaust 502, and thermostat 508. Additionally, water heater 500 includes physical adsorbent carbon capture unit 503, compressor 501, $CO_2$ output 507, water tank 510, carbon diffuser 509, carbonated water outlet 511, and control unit 505. Dryer 526 of FIG. 5B may include standard dryer components, such as burner 523, heat exchanger 525, burner exhaust 515, natural gas inlet 524, and control unit 514. Additionally, dryer 526 may include physical adsorbent carbon capture unit 520, water inlet 519, compressor 516 with $CO_2$ outlet 517, water tank 518, carbon diffuser 522, and carbonated water outlet 521. It is noted all CCS components of both water heater 500 and dryer 526 work in the manner as described for the CHP/CCHP aspects of FIGS. 1-4C, with component sizes, geometries and locations adjusted to conform to application architecture and performance specifications.

Recycled $CO_2$ Carrier Gas

In system 1000 depicted in FIG. 2, air is used as a carrier or purge gas source. Without being bound by theory, it is believed that solid adsorbents, including mono layer chemisorption and multi layer physisorption phenotypes, saturate or enhance adsorption effectiveness with increasing partial pressure for a given isotherm. Thus, while the relative low $CO_2$ component of standard temperature and pressure (STP) air assures high deadsorption rates, and therefore high capture efficiency, it also limits the resulting partial pressure and $CO_2$ purity of the captured product. Therefore, in some aspects, as shown in FIG. 6A, captured $CO_2$ is stored in tank 120, and is recycled via return piping 1142 and compressor 107. In some such aspects, recycling $CO_2$ for use as the carrier gas lessens the amount of free binding sites and thus lowers the capture capacity, but increases the resulting $CO_2$ purity of the captured gas. Thus, while the use of air typically results in greater carbon capture rates from exhaust gas, the use of recycled $CO_2$ affords increased partial pressure for higher solubility of carbonated water and/or $CO_2$ available for direct repurposing as biomass.

Figure 6B:
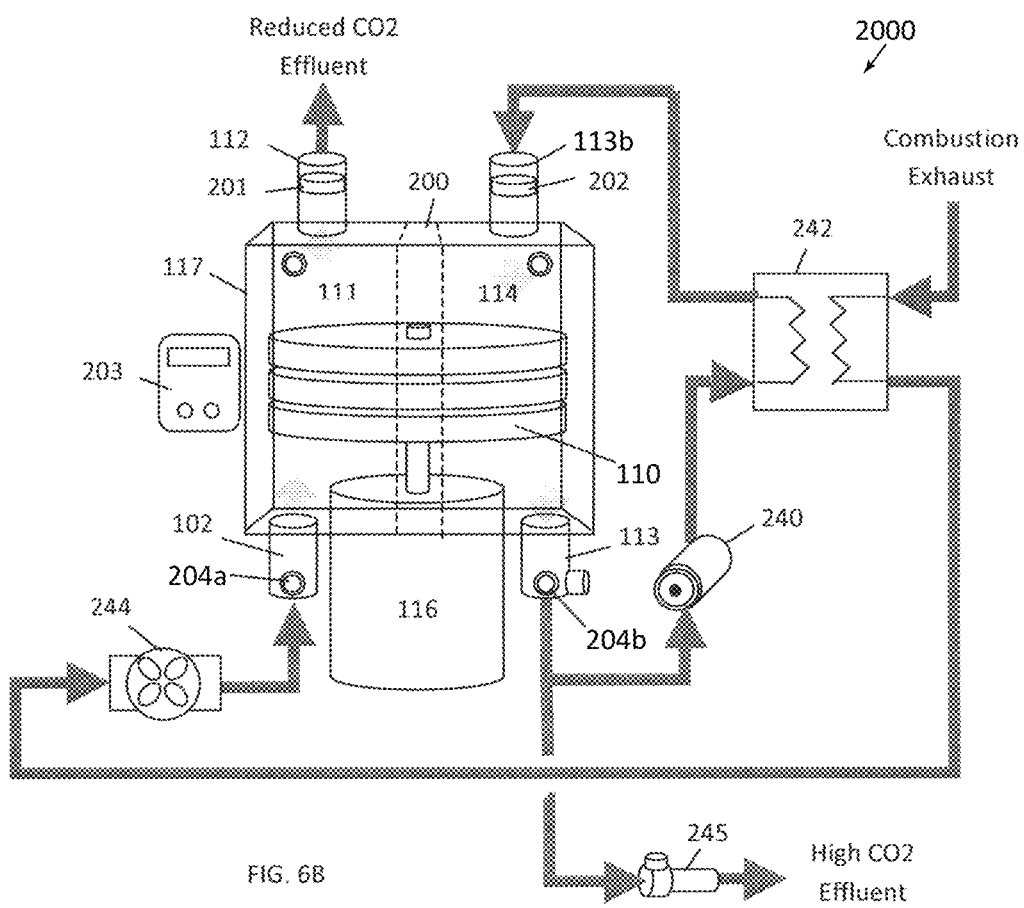
FIG. 6B depicts a micro-carbon capture system with a recycled carrier gas, according to one aspect of the present disclosure.
Figure 6A:
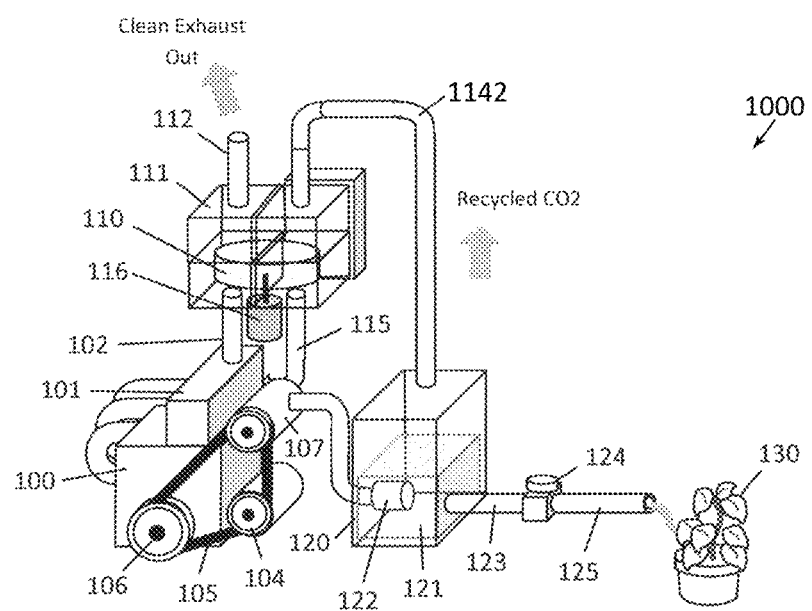
FIG. 6A depicts a micro-carbon capture system with a recycled carrier gas, according to one aspect of the present disclosure.

In some aspects, as shown in FIG. 6B, $CO_2$ is recycled via return through compressor 240 and heat exchanger 242 to regenerative input 113b. Heat exchangers 242 and 244 serve a dual purpose in both cooling inlet combustion exhaust, while also heating the $CO_2$ recirculation stream to temperatures sufficient for regenerating the physical adsorbent. Typically, silica and zeolite physical adsorbents operate to adsorb $CO_2$ at temperatures ranging from 5° C. to 200° C., while combustion exhausts may be at a temperature ranging from 250° C. to 400° C. Thus, heat exchangers 242 and 244 serve to cool exhaust to temperatures acceptable for adsorption of $CO_2$. $CO_2$ liberated in chamber 114 is then added to the effluent of chamber 114, which is again heated and recycled to further increase the $CO_2$ content. Finally, regulator 245 maintains the effluent output of chamber 114 at a pressure level sufficient to maintain flow rates for a given temperature and compressor output, which optimizes regeneration of the physical adsorbent. $CO_2$ levels above this value are then automatically released as a high $CO_2$ content effluent for input into compressor 107 for delivery to, e.g., water tank 120.

Soil and Alkylation Filters

In some aspects, as shown in FIGS. 7A-7C, system 1000 includes soil and alkylation filter unit 132 for use in directly repurposing and/or sequestering the captured carbon as biomass or solid carbonate. Soil and alkylation filter unit 132 includes a series of vertical drawers 144 with mesh or semi permeable bottoms and separators 131 allowing passage of gas through drawers 144 while affording containment of particulate contents of drawers 144. Soil and alkylation filter unit 132 is configured to allow high content $CO_2$ influent 133 to flow sequentially up through drawers 144 to exhaust port 136. The high content $CO_2$ influent 133 is drawn through soil and alkylation filter unit 132 via fan 139, either directly via line 137 or from containment tank 120, then through piping 133, depending upon the setting of 3-way valve 138. As the influent gas is derived, in whole or in part, via combustion exhaust, influent 133 is high in $CO_2$ content as well as traces of inorganic combustion products such as $H_2S$, $SO_2$, $NH_3$ and $NO_R$. Such gas is then passed upward within filtering unit 126 through at least one soil or compost filter 135 and/or at least one alkylation filter 134. Filters 135 contain either soil and/or compost with or without plants 140 contained therein. Without being bound by theory, it is believed that research has demonstrated that the combined effect of sequestration by soil particulates, the catalyst activity of micro organisms, and plant respiration effectively reform combustion products as biomass. As shown in FIG. 7B, drawers 144 may be removed for periodic servicing to add or remove soil, compost and formed lime stone, manage plants and add water as needed.

It is noted that the piping configuration shown is presented for illustrative purposes, and that one skilled in the art would understand that any number of piping configurations may be implemented. In some aspects, system 1000 includes only carbonated water tank 120 without filtering unit 126, only filtering unit 126 without water tank 120, or both filtering unit 126 and water tank 120.

Soil Filtering Unit with Automated Control

Without being bound by theory, it is believed that, for the portion of exhaust gas carbon dioxide captured as soil organic carbon (SOC) in living systems such as plants, microbes and fungus, research has shown that carbon capture rates are optimized within defined ranges of water and $CO_2$ levels. Specifically, 20-40% water by weight of soil mass and 400 to 2000 ppm of carbon dioxide. Thus, in some aspects, it is advantageous to automate system of FIGS. 7A-7C, as is shown in the automated system of FIG. 8. Watering within filtering unit 126 is automated via external water source 142, pump 141, sprinkler jets 147, humidity sensors 143, and control unit 149. For example and without limitation, control unit 149 may be a PLC that is programmed with logic instructions to control pump 141 to initiate watering within filtering unit 126 when the humidity sensors 143 detect a humidity that is below a preset limit. $CO_2$ influent is regulated via pump 139b, $CO_2$ sensors 152, and control unit 149. Control unit 149 may be programmed with logic instructions to control pump 139b to initiate and/or cease input of $CO_2$ into filtering unit 126 based upon $CO_2$ measurements taken by $CO_2$ sensors 152. Control unit 149 may be in data communication with pump 141, pump 139b, $CO_2$ sensors 152, pH sensors 145, and humidity sensors 143 for monitoring and/or control thereof. Additional control via soil temperature and pH sensors 145 may provide for optimal growth rates for plants, while stabilizing microbe and fungus populations to regulate decomposition so as to optimize trapped organic carbon, such as humus. In some aspects, activated carbon filter 148 is positioned at the outlet of filtering unit 126 as a final filter stage to trap hydrocarbons and inorganic and malodorous gases before release to the atmosphere. In some aspects, drip pan 150 is positioned to collect soil drainage within filtering unit 126. Exhaust vents 146 (e.g., louvered vents) may be positioned at least one, or all sides, at a top of filtering unit to allow exhaust to escape without allowing, e.g., rain water to enter.

In some aspects, alkylation filters 134 contain alkylating agents, such as calcium hydroxide, which serve to reduce $CO_2$ in a reaction, such as:

$$Ca(OH)_2 + CO_2 \rightarrow CaCO_3 + H_2O \quad \text{(Reaction 1)}$$

Reaction 1, above, forms calcium carbonate, which may be harvested as an ingredient for building materials such as concrete, or left within drawers 144 where it may be used as an alkylating agent to neutralize acidic compounds produced from hydration of inorganic gases within the soil filters according Reactions 2 and 3:

$$CaCO_3 + H_2SO_4 \rightarrow H_2O + CO_2 + CaSO_4 \quad \text{(Reaction 2)}$$

$$CaCO_3 + 2HNO_3 \rightarrow Ca(NO_3)_2 + H_2O + CO_2 \quad \text{(Reaction 3)}$$

Reactions 2 and 3 produce water, carbon dioxide, calcium nitrate, and sulfate salts. Carbon dioxide may again be sequestered as biomass by soil filers 135. Calcium nitrate is commonly used as a fertilizer and in wastewater treatment to limit organic production of hydrogen sulfide. Calcium sulfate precipitates as an insoluble hydrate.

In some aspects, sensors, such as temperature, $CO_2$, carbonic acid, carbonated water, and soil pH sensors may be added and connected to controller 203 in a feedback loop to track and adjust adsorption/deadsorption, soil temperatures, rotation speeds of motor 116, and soil water supplies to optimize $CO_2$ capture and repurposing yields and rates.

Soil Filtering Unit with Bioreactor

Figure 9:
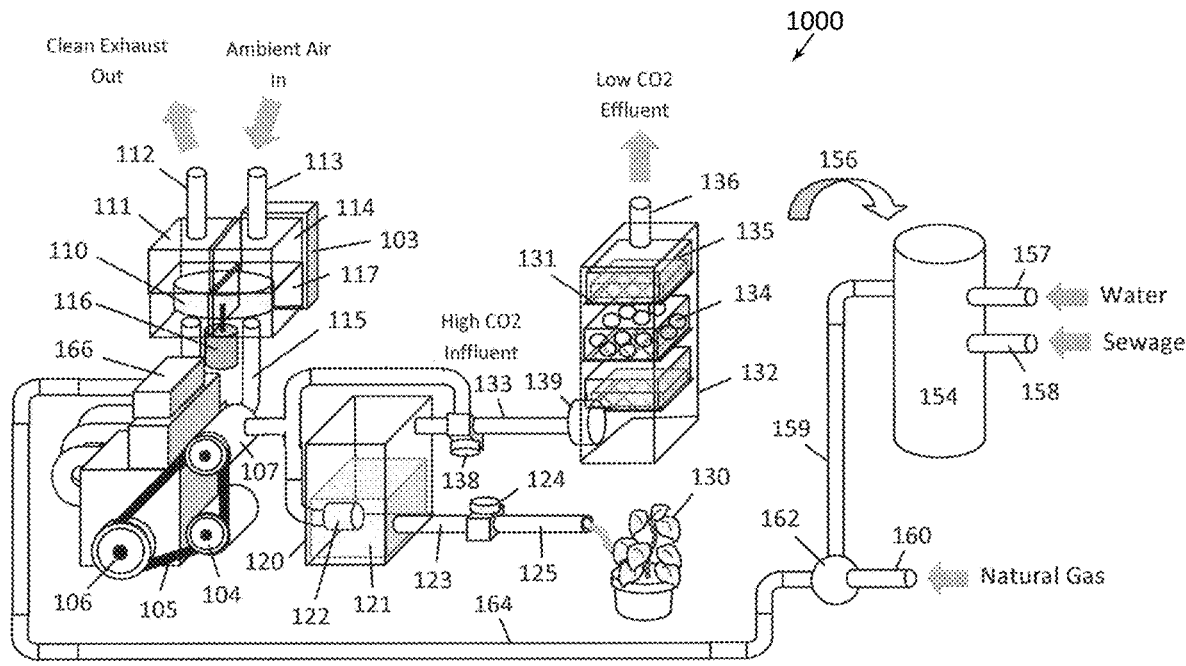
FIG. 9 depicts a soil filtering unit with a bioreactor, according to one aspect of the present disclosure.

In some aspects, as shown in FIG. 9, system 1000 includes bioreactor 154, which repurposes biomass 156 produced by filtering unit 132 (i.e., biomass generator) and/or sewage 158 into methane. The methane thus produced may be recycled, such as via 3-way valve 162 through piping 159 and 164 to supplement a main natural gas supply 160 as a fuel source for the micro CHP (mCHP) engine 100. Fuel enters ICE 100 via fuel inlet port 166.

Bioreactor 154 may contain a number of anaerobic bacteria and/or protozoa that serve to decompose biomass 156 and/or sewage 158 with the aid of a water supply 157 in a two-step process involving biohydrogen generation and biomethanation. It is noted that biogeneration of methane is a natural and beneficial partner for carbon capture, as methanogenesis is a natural final stage of organic decay as fine organic matter affording breakdown to the simplest organic elements when oxygen has been depleted and $H_2$ and $CO_2$ accumulate. First, organic matter 156 from filtering unit 132 soil containers 134, which may be in the form of plants 140, fungus, bacteria and/or humus, is harvested and placed into bioreactor 154 (an air-tight tank). Within bioreactor 154, organic matter 156, optionally mixed with sewage 158 from an external source, is hydrated via external water supply 157 to provide a nurturing anoxic environment for anaerobic digestion.

Although a number of chemical processes take place during digestion, biohyrodgenesis carried out by microbes such as *Clostridium, Desulfovibrio*, and *Ralstonia* typically converts glucose to acetic acid, $CO_2$ and hydrogen in accordance with Reaction 4:

$$C_6H_{12}O_6 + 2H_2O \rightarrow 2CH_3CO_2H + 2CO_2 + 4H_2 \quad \text{(Reaction 4)}$$

It is noted that the fermentation occurring within bioreactor 154 is a dark fermentation process not requiring light energy, and is exergonic, which is highly beneficial for bioreactor applications requiring lower energy input while affording continuous operation (e.g., 24 hour operation).

Next, methanogen microbes further digest the acetic acid and hydrogen according to dual Reactions 5 and 6:

$$CH_3COOH \rightarrow CH_4 + CO_2 \quad \text{(Reaction 5)}$$

$$CO_2 + 4H_2 \rightarrow CH_4 + 2H_2O \quad \text{(Reaction 6)}$$

In Reactions 5 and 6, methane, water and carbon dioxide are produced. It is noted that, by controlling the ratio of acetotrophic and hydrogenotrophic microbe yields, it is possible to obtain combinations such that a large percentage of harvested organic matter 156 is converted to methane. Such microbes may include any number of some fifty known species containing molecular markers for methogenesis proteins such as *Methanobacterium bryantii* and *Methanobrevibacter arboriphilicus*.

mCHP Caron Capture and Repurposing System

Figure 8:
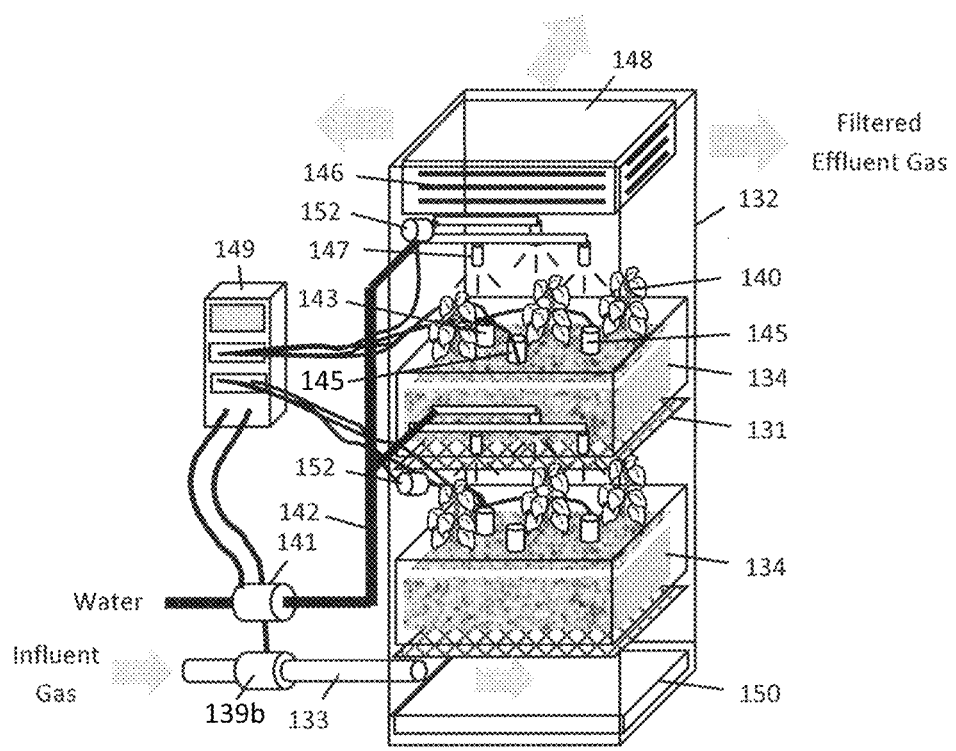
FIG. 8 depicts a soil filtering unit with automated control, according to one aspect of the present disclosure.
Figure 10:
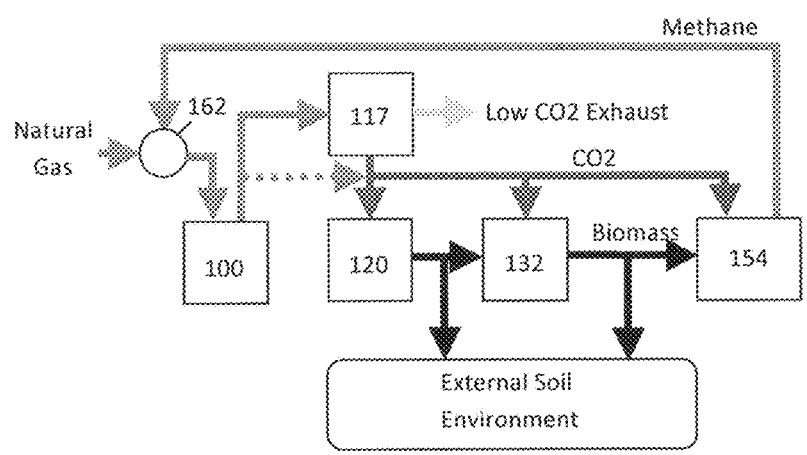
FIG. 10 depicts a schematic of an mCHP carbon capture and repurposing system, according to one aspect of the present disclosure.

FIG. 10 is a simplified schematic of system 1000, showing the subcomponent relationships. It is noted that, although carbon purity introduced into water tank 120, filtering unit 132 and bioreactor 154 is enhanced via the carbon capture process of the solid, physical adsorption scrubber 117, all of these systems may function using raw exhaust as denoted by the dashed arrow resulting in a number of possible carbon source and sink permutations. First, carbon is returned directly to the soil for absorption as carbonated water via water tank 120 as shown in FIG. 2. Second, carbon is fixated as biomass such as plants, fungus or humus within the soil containers 134 of filtering unit 132, either via photosynthesis by plant life or chemosynthesis via autotrophic organisms such as fungi, bacteria and protozoa as shown in FIGS. 7A-8. The resulting accumulated biomass may then be transferred directly back to the soil of an external environment for natural sequestration or to bioreactor 154 for further bacterial digestion. Lastly, bioreactor 154 performs a final, high-level decomposition similar to that carried out during enteric fermentation in ruminants and generation of marsh gases. Thus, the system serves to either capture and return combustion released carbon back to the environment in a natural form, or to recycle carbon for reuse as a fuel source using natural processes and no or few supporting chemicals.

It should be noted and understood that many of the specific features or combination of features illustrated in or introduced above (or described in the claims submitted below), and\or discussed in accompanying descriptions, may be combined with or incorporated with or other feature (s) described or illustrated in any other Figure provided herein. Moreover, the following claims serve also to describe and illustrate some (but not all) aspects of the present disclosure. The claims serve therefore as an integral part of the present disclosure.

The foregoing description has been presented for purposes of illustration and description of preferred aspects. This description is not intended to limit associated concepts to the various systems, apparatus, structures, processes, and methods specifically described herein. For example, aspects of the processes and equipment illustrated by the Figures and discussed above may be employed or prove suitable for use with other systems and apparatus. The aspects described and illustrated herein are further intended to explain the best modes for practicing the system and methods, and to enable others skilled in the art to utilize same and other aspects and with various modifications required by the particular applications or uses of the present disclosure.

What is claimed is:

1. A micro carbon capture system comprising:
  a fossil fuel oxidation unit;
  an adsorbent positioned to receive exhaust gas of the fossil fuel oxidation unit, wherein the adsorbent is positioned to adsorb $CO_2$ from the exhaust gas; and
  a soil filtering unit positioned to receive $CO_2$ released from the adsorbent;
  wherein the soil filtering unit is adapted to repurpose, sequester, or combinations thereof the $CO_2$ as biomass or solid carbonate; and
  wherein the soil filtering unit comprises at least one soil or compost filter, at least one alkylation filter, or combinations thereof positioned such that $CO_2$ filters through the at least one soil or compost filter, $CO_2$ filters through the at least one alkylation filter, or combinations thereof.

2. The system of claim 1, wherein the adsorbent is a regeneratable adsorbent, the system further comprising a cycling mechanism configured to cycle the regeneratable adsorbent between a first position and a second position;
  wherein, in the first position, the adsorbent is positioned to adsorb $CO_2$ from the exhaust gas and, in the second position, the adsorbent is positioned to release the $CO_2$.

3. The micro carbon capture system of claim 2, wherein the cycling mechanism includes a rotor operatively coupled to a motor, wherein the adsorbent is positioned on the rotor, and wherein the motor is configured to rotate the rotor to move the adsorbent between the first position and the second position;
  wherein the adsorbent is positioned within a housing, the housing including an adsorbing chamber positioned to receive the exhaust and a releasing chamber positioned to receive the released $CO_2$; and
  wherein rotor timing is synchronized with exhaust load and $CO_2$ content, such that a majority of trapped $CO_2$ is released upon a single revolution with the adsorbent regenerated to accept a new $CO_2$ load upon reentering into the adsorbing chamber.

4. The micro carbon capture system of claim 3, wherein the motor is driven directly from the fossil fuel oxidation unit, or is powered by an external power source.

5. The micro carbon capture system of claim 3, wherein the adsorbing chamber is maintained within a temperature range suitable for adsorption of $CO_2$ onto the adsorbent, and wherein the releasing chamber is maintained within a temperature range suitable for deadsorption of $CO_2$ from the adsorbent, wherein the temperature within the releasing chamber is higher than the temperature within the adsorbing chamber.

6. The micro carbon capture system of claim 2, wherein regeneration of the adsorbent is achieved via: pressure cycling using a pressure sensitive adsorbent; or current cycling using an electrical charge sensitive adsorbent.

7. The micro carbon capture system of claim 6, wherein:
a pressure source is provided by a compressor powered either mechanically by a CHP/CCHP crankshaft or electrically by a CHP/CCHP generator or by an external power supply to provide the pressure cycling; or
a current source is provided by either a generator of a CHP/CCHP system or an external power supply to provide the current cycling.

8. The micro carbon capture system of claim 1, wherein the soil filtering unit comprises a vertical series of drawers, the drawers comprising soil or compost filters, alkylation filters, or combinations thereof, wherein the drawers are permeable, allowing passage of $CO_2$ through the drawers.

9. The micro carbon capture system of claim 1, further comprising a bioreactor in fluid communication with a water supply, wherein the bioreactor receives biomass produced in the soil filtering unit, the bioreactor containing anaerobic bacteria, protozoa, or combinations thereof that decompose the biomass in the presence of water from the water supply in a two-step process involving biohydrogen generation and biomethanation.

10. The micro carbon capture system of claim 1, wherein the fossil fuel oxidation unit is an internal combustion engine, a water heater, or a clothing dryer.

11. The micro carbon capture system of claim 1, wherein the adsorbent is a solid adsorbent.

12. A micro carbon capture system comprising:
a fossil fuel oxidation unit;
an adsorbent positioned to receive exhaust gas of the fossil fuel oxidation unit, wherein the adsorbent is positioned to adsorb $CO_2$ from the exhaust gas; and
a water tank positioned to receive $CO_2$ released from the adsorbent;
wherein the water tank contains water, wherein $CO_2$ is stored as carbonated water within the water tank;
a compressor, wherein the compressor is in fluid communication between the adsorbent and the water tank.

13. The micro carbon capture system of claim 12, further comprising an irrigation system in fluid communication with the water tank, the irrigation system positioned to receive the carbonated water from the water tank and deliver the carbonated water to vegetation.

14. A micro carbon capture system comprising:
a fossil fuel oxidation unit;
an adsorbent positioned to receive exhaust gas of the fossil fuel oxidation unit, wherein the adsorbent is positioned to adsorb $CO_2$ from the exhaust gas;
a water tank positioned to receive $CO_2$ released from the adsorbent, wherein the water tank contains water, wherein $CO_2$ is stored as carbonated water within the water tank; and
a compressor and a carbon diffuser, wherein the compressor is in fluid communication between the adsorbent and the water tank, and wherein the carbon diffuser is positioned to disperse, atomize, or combinations thereof the released $CO_2$ into the water within the water tank.

15. The micro carbon capture system of claim 14, wherein the compressor is driven by the fossil fuel oxidation unit, or is powered by an external power source.

16. A method of capturing carbon, the method comprising;
directing exhaust from a fossil fuel oxidation unit to an adsorbent;
adsorbing $CO_2$ from with the exhaust onto the adsorbent;
deadsorbing the $CO_2$ from the adsorbent; and
releasing the deadsorbed $CO_2$ into a soil filtering unit, the soil filtering unit comprising at least one soil or compost filter, at least one alkylation filter, or combinations thereof, wherein, within the soil filtering unit, sequestration of $CO_2$ by soil particulates occurs, catalyst activity on $CO_2$ by microorganisms occurs, plant respiration of $CO_2$ occurs, or combinations thereof.

* * * * *